Figure 1:
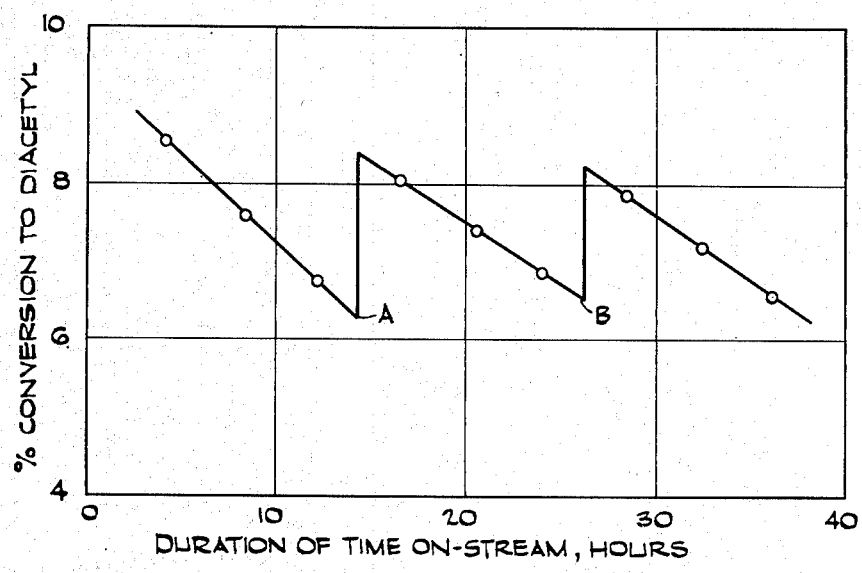

Aug. 17, 1954  L. M. PETERS  2,686,813
PROCESS OF OXIDIZING MONOKEYTONES
Filed May 8, 1952

Inventor:
Leslie M. Peters
By
His Agent

Patented Aug. 17, 1954

2,686,813

UNITED STATES PATENT OFFICE 2,686,813

PROCESS OF OXIDIZING MONOKETONES

Leslie M. Peters, San Francisco, Calif., assignor to Shell Development Company, Emeryville, Calif., a corporation of Delaware Application May 8, 1952, Serial No. 286,690

6 Claims. (Cl. 260—593)

This invention relates to processes for the partial oxidation of organic compounds in the gaseous state in the presence of a metal oxide oxidation catalyst, and to improvements in the same. More particularly, the present invention relates to a method for maintaining and/or restoring the activity of the catalyst during the execution of such processes. This application is a continuation-in-part of copending application Serial No. 33,096, filed June 15, 1948, now U. S. Patent No. 2,608,585, issued August 26, 1952, as a joint application of the present applicant and Kenneth D. Detling and Thurston Skei.

The present invention is concerned with processes for the oxidation of ketones in which there is employed as the oxidation catalyst an oxide of a heavy metal. In particular, the invention concerns a method for partial oxidation of monoketones containing four or more carbon atoms to produce diketones in contact with a catalyst composed of or essentially comprising an oxide of a heavy metal which is capable of existing in the form of more than one oxide, to maintain the activity of the catalyst at an overall high level under conditions which otherwise would lead to deterioration of catalyst activity. The invention includes as one of its features a method for reactivating a catalyst essentially comprising an oxide of a heavy metal, such as cuprous oxide, which may have deteriorated in activity as a result of use under such conditions in the processes of the character to which the invention relates that loss in activity of the catalyst has been incurred.

The invention is limited to those processes in which a gaseous mixture comprising a ketone containing four or more carbon atoms having a methylene group directly attached to the carbonyl group, and a molecular oxygen-containing gas, e. g., air oxygen, oxygen-enriched air, etc., is passed into contact with a solid catalyst essentially comprising an oxide of a metal which is capable of existing in the form of more than one oxide under conditions which favor the desired oxidation. Such a process ordinarily will be executed with the catalyst in the form of a fixed bed, that is, immobile in bulk, positioned in a suitable reactor or reactors, and a continuous steam of the gaseous mixture will be passed into contact with the catalyst bed, the gaseous effluent from the reactor containing the desired product. In other cases, the catalyst may be in a mobile, or fluidized form in a reactor, and a portion of the catalyst may be carried along with the effluent from the reactor, to be subsequently returned. In still other cases the catalyst may be in the form of a mobile, or pseudo-liquid, or fluidized bed of finely-divided solid catalyst, but permanently held in a reaction zone. Instead of finely-divided catalysts carried along in part by the gaseous effluent from the reaction zone, there also may be used at times mobile catalyst beds from and to which catalyst is continuously withdrawn and added, respectively, by suitable mechanical means. The principles of the invention are applicable in all instances; however, certain of the advantages of the invention are particularly realized in the case of the immobile catalyst, or fixed catalyst bed type of operations, and the invention will be described with particular reference thereto.

In accordance with this invention the activity of catalysts comprising an oxide of a heavy metal which is capable of existing in the form of more than one oxide, which catalysts have become at least partially deactivated by use in processes for the direct catalytic oxidation of ketones of the character herein ascertained, is substantially restored and a desirably high over-all level of activity of the catalyst is maintained by periodically subjecting the catalyst for brief periods of time to the action of the ketone in the substantial absence of oxygen-containing gas, while otherwise substantially maintaining the operating conditions. In the opinion of the applicant it could not have been foreseen that the method of the present invention would be effective to attain the desired objects of the invention. Ketones, as is well known, are reactive oxygen-containing organic compounds which exhibit a definite tendency to condense to polymers and lower molecular weight products. It was unexpected that the action of these reactive materials upon at least partially deactivated catalysts in the substantial absence of oxygen would actually restore the activity of the catalyst rather than as could have been expected, even further impair the catalytic activity of the contact material.

The present invention is not concerned with the type of catalyst treatment known as catalyst regeneration, which treatment involves the removal, as by burning off or washing, or by decomposing with steam, of carbonaceous, tarry, or like materials deposited on the surface of a catalyst or in the pores of a catalyst. Such practices are well-known, particularly in processes such as catalytic cracking, polymerization, etc., applied to hydrocarbons or hydrocarbon mixtures. The formation of deposits on or in the heavy metal oxide catalysts with which the invention is concerned does not cause a serious problem in the processes for the oxidation of ketones with which the present invention is concerned because of the negligible extent to which such deposition ordinarily occurs. However, if such deposits are formed on or in the oxidation catalysts they may be removed by known procedures as required, generally at quite infrequent intervals, independently of the practice of the method of the present invention.

The present invention is directed to a treatment designed to overcome or to prevent deterioration in catalyst activity from less tangible causes than mechanical obstruction of the catalyst by deposits thereon or therein. In the processes to which the invention relates there may be observed over prolonged periods of operation a gradual and progressive decline in the activity of the heavy metal oxide catalyst for promoting the desired reaction. The decline may be qualitative—that is, the selectivity of the catalyst may be reduced, with the result that the percentage conversion of the mono-ketone reactant to the desired diketone becomes less and the relative proportion of undesired by-products increases correspondingly—or the decline may be quantitative in the sense that the catalyst simply becomes less active for promoting oxidation reactions, with or without change in selectivity. In the latter case, the amount of the feed material that is oxidized decreases, while in the former case it is the yield of desired product based upon the amount of the feed consumed that decreases. In many cases the decrease in activity may be accompanied by little or no change in the outward appearance of the catalyst.

While it is not desired to limit the invention according to any theory, it appears possible that these changes in catalyst activity may be due, at least in part, to qualitative and/or quantitative changes in adsorption sites on the surface of the catalyst. It is generally recognized that heterogeneous catalysis by a solid catalyst is a surface phenomenon in which adsorption of reactants and reaction products at adsorptive sites on the catalyst plays an important role. A qualitative change, chemical or physical, in the character of the adsorption sites could lead to a corresponding change in the activity of the catalyst. Such changes in the adsorptive sites may occur even though the catalyst, viewed in bulk, appears unchanged. On the other hand, a reduction in the number of active sites, as by the adsorption on the catalyst of a component normally present in the gaseous reaction mixture (for example, a product of side reaction, or an impurity in the gaseous feed) could lead to a marked decrease in the overall activity of the catalyst. Since under normal operating conditions of a continuous process, all components of the reaction mixture ordinarily are present in relatively constant amounts, each tends to be adsorbed by the catalyst until equilibrium is reached. Changes in the character of the adsorptive sites, even though slight, may result in preferential adsorption of a species not involved in the mechanism of the oxidation, with consequent "blocking" of such sites from playing a useful role on the catalyst surface. The method of the present invention appears to operate through control, regulation, or modification of such preferential adsorption by or upon the catalyst rather than by removal of deposits or the like which mechanically block or foul the catalyst.

The oxidation of the mono-ketone to produce the desired diketone ordinarily will be carried out at an elevated temperature. The temperature generally is within the range of from about 150° C. to about 650° C. However, higher temperatures may in some cases be employed, provided excessive thermal decomposition of the organic reactant and/or the desired product does not result. In other cases, maximum temperatures lower than 600° C. are desirable, say 450° C. as a maximum. Temperatures of about 300° C. to 500° C. may be employed. In the method of the present invention, in each case the temperatures that are employed during the reactivation step are substantially those that are used in the oxidation process to which the method is applied. That is, when the so-called isothermal type of reactor is employed, no change in the temperature of the reactor is required. This is of considerable practical advantage, particularly in operations involving large size apparatus, because of the undesirability in such cases of disturbing steady temperature conditions once established. Of course, localized variations in the temperature of portions of the catalyst bed may occur, possibly because of disappearance during treatment according to the present invention, of the "hot spot" that otherwise generally exists in the catalyst bed as a result of the highly exothermic nature of the oxidation reaction. The method of the invention also is advantageous when employed in processes utilizing so-called adiabatic reactors—reactors in which means for heat removal are absent and the evolved heat goes primarily to warm the reactor feed to the maximum reaction temperature—because of the short periods of treatment that are employed. In reactors of a substantial size, that is, in reactors of a size useful for operations on a commercial or plant scale, the heat stored in the catalyst bed and the walls, etc., of the reactor generally is sufficient to maintain adequately the temperature of the system without requiring adjustment of preheat (if any) of the feed or the provision of means to maintain the elevated temperature during the reactivation treatment.

The oxidation processes to which the method of the invention is applicable may be carried out under atmospheric pressures or at pressures above or below atmospheric pressure. Superatmospheric pressures may be employed; however, excessively high pressures, e. g., above about 20 atmospheres, usually are avoided because it is desired to maintain the organic materials in the vapor state. No substantial change in pressure is involved in the application of the method of the present invention, and no change in the pressure is required. This characteristic makes the method of particular value in processes which involve apparatus of substantial volume and in which, accordingly, need for change of the existing pressure would be undesirable. When the change in flow rate or pressure that would result from decrease or interruption of the flow of oxygen or oxygen-containing gas is not undesirable it will not be necessary to adjust the flow rates of the other components of the feed to compensate. In other cases, the flow rates of other components of the gaseous feed may be increased suitably to maintain the previously existing conditions of pressure, and rate of flow of gaseous mixture over the catalyst.

In accordance with the present invention, high catalyst activity at a substantially constant overall level may be maintained in gas phase oxidation processes for the oxidation of ketones containing at least four carbon atoms in the presence of an oxide of a heavy metal which is capable of existing in the form of more than one oxide by periodically substantially decreasing, or interrupting the flow of oxygen or oxygen-containing gas to the catalyst while, at the same time, maintaining the conditions of operation otherwise essentially unchanged. The method of the invention may be illustrated specifically by its application in the catalytic oxidation of mono-ketones of four or more carbon atoms which are capable of existing in the enol form to diketones in the presence of an oxide of a heavy metal of variable valency to form diketones; for example, the catalytic oxidation of the methyl ethyl ketone to diacetyl in the presence of cuprous oxide, molybdenum oxide, manganese oxide, tungsten oxide, cobalt oxide, lead oxide, or vanadium oxide, and the corresponding oxidation of methyl isobutyl ketone to methyl isopropyl glyoxal. Such a process is described and claimed in U. S. Patent No. 2,393,532 issued January 22, 1946, to G. W. Hearne, M. L. Adams, and V. W. Buls. As the ketone there may be employed any mono-ketone of four or more carbon atoms having a methylene group directly attached to the carbonyl group. The ketone may be acyclic or cyclic and it may or may not be substituted by inert or reactive substituents, such as halogen, alkoxy, etc.

Illustrative ketones which may be employed as starting materials include the following: methyl ethyl ketone, methyl propyl ketone, methyl butyl ketone, methyl isobutyl ketone, ethyl propyl ketone, cyclohexanone, methyl benzyl ketone, diethyl ketone, and the like. According to the process of said patent the diketone products are characterized in that the two carbonyl groups stand in vicinal relation to each other. Additionally to the oxides mentioned in the immediately preceding paragraph, there may be employed oxides of thallium, iron, chromium, titanium, uranium, columbium, tantalum, and other oxides of metals which form more than one oxide.

The method of the present invention applies only to the continuous method of operation described in said patent, wherein the heavy metal oxide is used as a catalyst for the direct reaction between the mono-ketone reactant and molecular oxygen, and does not relate to the discontinuous method wherein the metal oxide is the oxidizing agent and is reacted with the mono-ketone in the absence of air or oxygen to produce the desired diketone and then reoxidized by reaction with air or oxygen in the absence of the ketone.

In carrying out the catalytic oxidation of mono-ketones to diketones a gaseous mixture comprising a mono-ketone of at least four carbon atoms capable of rearranging to an enol form, and molecular oxygen, is passed into contact with a catalyst comprising one or more oxides of a heavy metal which is capable of forming more than one oxide, preferably at a temperature within the range of from about 150° C. to about 450° C. and the desired diketone is recovered from the resulting gaseous mixture. The catalyst may be composed of heavy metal oxide alone or the catalyst may comprise the heavy metal oxide supported on a carrier metal, for example, silica gel, activated alumina, Alundum, pumice, silicon carbide porous aggregates, diatomaceous earth, etc. The molecular oxygen may be in the form of pure oxygen or it may be supplied in the form of air or like molecular oxygen-containing gas. The gaseous mixture may comprise, in addition to the mono-ketone and the molecular oxygen, an inert diluent gas, such as steam, hydrogen, carbon dioxide, or the like.

Figure 2:
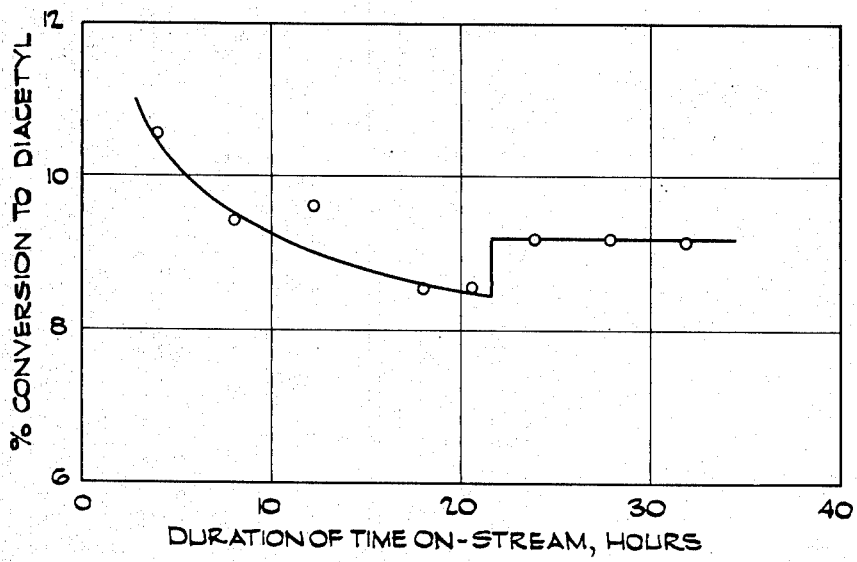

As specific illustrations of the operation of the method of the present invention the results described in the graphs presented as Figures 1 and 2 may be considered. In the experiments described in these figures, methyl ethyl ketone was oxidized by reaction with molecular oxygen over a solid catalyst essentially comprising cuprous oxide. The catalyst was one prepared by impregnating 4–6 mesh silicon carbide porous aggregates with a 56% by weight aqueous solution of cupric nitrate, drying and heating the impregnated silicon carbide porous aggregate to 300° C. in a current of air to convert the cupric nitrate to copper oxide. Analyses showed that the catalyst contained approximately 11% of copper by weight. In the experiment described in Figure 1, the catalyst was positioned in a steel reaction tube of a conventional design and provided with the usual thermocouple and means for supplying feed and withdrawing effluent and was heated by means of a surrounding oil bath maintained at 292° C. A mixture of methyl ethyl ketone, steam and air was passed over the catalyst at the following rates:

Methyl ethyl ketone_____ 8.52 pounds per hour.
Steam _____ 17.5 pounds per hour.
Air_____ 111 cubic feet per hour (S. T. P.).

The activity of the catalyst was measured by periodically collecting samples of the effluent gas for short periods of operation and calculating from suitable analyses thereof the percentage conversion of the methyl ethyl ketone fed to diacetyl. As shown in Figure 1, at the time of the first analysis about 8.6% of the methyl ethyl ketone fed was converted to diacetyl under the operating conditions. After 12 hours' operation the conversion had fallen off to about 6.7%. After 15 hours' operation (point A on Figure 1) an equal volume of nitrogen was substituted for the air fed to the reactor and the mixture of methyl ethyl ketone, steam and nitrogen was passed over the catalyst for 15 minutes, the operating conditions otherwise being unchanged. Upon restoration of the flow of the air to the catalyst it was found that the activity of the catalyst had been increased by the interruption of the flow of oxygen to the catalyst to a level represented by an about 8.4% conversion of the methyl ethyl ketone. After an additional 12 hours' operation the activity of the catalyst again had decreased to the level indicated by point B in Figure 1 and the reactivation treatment was repeated. By periodically repeating the activation treatment at intervals of about 12 hours, the activity of the catalyst could have been maintained at an effective level over prolonged periods of operation. Figure 2 describes the results of a similar experiment conducted over a copper oxide catalyst prepared in the manner described above. During the initial 20 hours' operation the catalyst was employed without reactivation. The catalyst had a high initial activity but as the experiment continued through the initial 20 hours the activity of the catalyst rapidly decreased. After 20 hours' operation the catalyst was periodically reactivated every four hours by turning off the feed of air for 10 minutes and substituting an equal volume of nitrogen. As shown in Figure 2, a level of activity was maintained, significantly higher than the activity observed immediately before application of the reactivation treatment.

It will be understood that it is not essential in accordance with the invention to reactivate the catalyst at regular intervals during the oxidation process. In some cases, however, it may be desired to operate with the aid of automatic equipment which shuts off, or substantially reduces, the flow of the oxygen-containing gas at regular periodic intervals. The frequency of the reactivation treatment that will be required may be determined by preliminary experiments and suitable timing thereby arranged. In some cases, it may be desirable to reactivate the catalyst as frequently as once every hour or two, while in other cases reactivation at only infrequent intervals may be required, say, after every hundred or more hours' operation. The invention also includes determining the necessary frequency of reactivation by continuously or periodically estimating the activity of the catalyst, and reactivating according to the method of the invention only when necessary. Samples of the effluent from the reaction zone may be withdrawn and analyzed to determine the content of a component, such as the desired diketone, the oxygen, etc., and the reactivation treatment given only when it appears from such analyses to be required, or when the catalyst activity has decreased to a predetermined level. As stated previously, the method of the invention is in many instances of particular advantage when used in connection with fixed bed catalyst, especially in the isothermal type of reactor. One reason for the advantage is the relatively brief period that is required for the reactivation treatment. Ordinarily, turning off or substantially reducing the flow of oxygen to the catalyst for not over one hour is sufficient. In many cases, periods from two or three minutes to one-half hour suffice. Under otherwise similar conditions, the shorter the time between the intervals of decreased or interrupted oxygen flow the shorter the interval that generally may be used. In the first-described specific instance the "on-stream" period of each cycle was 12 hours and the reactivation period was 15 minutes. In other words, only 2% of the total cycle time was required by the reactivation. Under conditions which would cause less rapid catalyst deactivation even a smaller proportion of the total time would be required. With isothermal reactors, which generally are very expensive, it therefore becomes a simple matter to provide an accumulator or lagging vessel in which crude product can be stored, for example, after condensation from the reactor effluent, to enable a constant supply to later stages of the process, such as product purification stages. In effect, continuous operations are obtained despite the use of only a single reactor and the discontinuous flow of oxygen to the reactor. If a plurality of reactors is employed, the method of the invention may be practiced advantageously by arranging the reactors in parallel and furnishing the feed components as through valved manifolds providing independent control of the supply of each component, or at least of the oxygen or oxygen-containing gas, to each reactor. The catalyst in any one or more reactor or reactors may be reactivated by interrupting for a brief period of time the flow of oxygen or oxygen-containing gas to that reactor without disturbing the feed supply to the other reactor. Effluent from the reactor in which the catalyst is undergoing reactivation may be combined with the feed to the other reactors. The reactivation treatment may be applied successively to the catalyst in the several reactors at intervals as required.

In the catalytic gas-phase processes for the oxidation of mono-ketones with which the invention is concerned, the mono-ketone ordinarily is employed in excess on a mole basis compared to the molecular oxygen and may be present in amounts corresponding to from about 2 to about 30 moles per mole of molecular oxygen. The composition of the reactor feed often is such that an increase in the amount of oxygen would result in the formation of an explosive mixture. In other words, such processes often are operated with amounts of oxygen below the ranges of explosive mixtures. It will be apparent that in such cases the method of the invention positively avoids the danger of forming an explosive mixture in the apparatus. This is a very real advantage in large scale operations, especially in view of the fact that it is thus inherent in the method of the invention and does not require special precautions for realization.

In some cases it may be desired, after shutting off the flow of oxygen or oxygen-containing gas to the catalyst bed, to sweep the catalyst bed with an inert gas, such as steam, carbon dioxide, nitrogen, flue gas, etc., in the absence of the mono-ketone, prior to restoring the flow of the reaction mixture to the catalyst. Processes of the character to which the method of the invention is applicable may be conducted with an inert diluent, or gas, in the mixture supplied to the catalyst. When desired, the inert gas may be passed over the catalyst in the absence of the oxygen and of the mono-ketone, under the conditions of pressure and temperature existing during the oxidation, and the flow of mono-ketone and the oxygen then restored.

I claim as my invention:

1. In a continuous process for oxidizing methyl ethyl ketone by direct reaction with molecular oxygen in the presence of a catalyst essentially comprising cuprous oxide to form diacetyl, which process comprises passing a gaseous mixture comprising methyl ethyl ketone and molecular oxygen in a molar ratio of at least 2 to 1 into contact with said catalyst at a temperature from about 150° C. to about 450° C., whereby there is formed a gaseous product containing diacetyl, separating said product from the catalyst, the improvement whereby a high level of catalyst activity is maintained, said improvement consisting of at intervals of time decreasing for a brief period of time the flow of molecular oxygen to the catalyst while maintaining the conditions otherwise substantially unchanged, and after each period of decreased flow of oxygen to the catalyst restoring the flow of oxygen to the catalyst.

2. In a continuous process for oxidizing methyl ethyl ketone by reaction with molecular oxygen in the presence of a catalyst essentially comprising cuprous oxide to form diacetyl, which process comprises passing a gaseous mixture comprising methyl ethyl ketone and molecular oxygen in a molecular ratio of at least 2 to 1, into contact with a catalyst essentially comprising cuprous oxide at a temperature of from about 150° C. to about 450° C., whereby there is formed a gaseous product containing diacetyl, separating said product from the catalyst, the step consisting of at intervals of time interrupting for a brief period of time the flow of molecular oxygen to the catalyst while maintaining the conditions otherwise substantially unchanged and after each period of decreased flow of molecular oxygen to the catalyst restoring the flow of molecular oxygen to the catalyst.

3. In a continuous process for oxidizing methyl ethyl ketone by reaction with molecular oxygen in the presence of a catalyst essentially comprising cuprous oxide to form diacetyl, which process comprises passing a gaseous mixture comprising methyl ethyl ketone and molecular oxygen in a molecular ratio of at least 2 to 1 into contact with said catalyst at a temperature within the range of from about 150° C. to about 450° C. whereby there is formed a gaseous product containing diacetyl, separating said product from the catalyst, the method of maintaining high activity of the catalyst which consists of at periodic intervals decreasing for a brief period of time the flow of molecular oxygen to the catalyst while maintaining the flow of methyl ethyl ketone to the catalyst and the temperature within said range of from about 150° C. to about 450° C. and after each period of decreased flow of molecular oxygen to the catalyst restoring the flow of molecular oxygen to the catalyst.

4. In a continuous process for oxidizing a mono-ketone of at least four carbon atoms capable of rearranging to an enol form by reaction with molecular oxygen in the presence of a catalyst essentially comprising cuprous oxide, which process comprises passing a gaseous mixture comprising a ketone of at least four carbon atoms capable of rearranging to an enol form and molecular oxygen in a molecular ratio of at least 2 to 1 into contact with said catalyst at a temperature within the range of from about 150° C. to about 450° C., whereby there is formed a gaseous product containing diketone as oxidation product, separating said gaseous product from the catalyst, the method of maintaining high activity of the catalyst which consists of at periodic intervals discontinuing for a brief period of time the flow of molecular oxygen to the catalyst while maintaining the flow of the ketone of at least four carbon atoms to the catalyst and the temperature within said range of from about 150° C. to about 450° C. and after each period of decreased flow of molecular oxygen to the catalyst restoring the flow of molecular oxygen to the catalyst.

5. In a continuous process wherein a gaseous mixture comprising a mono-ketone of at least four carbon atoms having a methylene group directly bonded to the carbon atom of the carbonyl group and molecular oxygen is passed into contact with a fixed bed of catalyst essentially comprising cuprous oxide to oxidize the mono-ketone to a corresponding diketone of at least four carbon atoms, the method of maintaining high over-all activity of the catalyst by periodically and successively shutting off oxygen flow, restoring oxygen flow, shutting off oxygen flow, restoring oxygen flow, while maintaining the conditions otherwise substantially unchanged and so doing at intervals of time throughout the duration of the process.

6. In a continuous process for oxidizing a mono-ketone of at least four carbon atoms capable of rearranging to an enol form by reaction with molecular oxygen in the presence of a solid catalyst essentially comprising cuprous oxide, which process comprises passing a gaseous mixture comprising said mono-ketone and molecular oxygen in a molecular ratio of at least 2 to 1 into contact with the catalyst at a temperature of from about 150° C. to about 450° C., whereby the mono-ketone is oxidized to a vicinal diketone, separating from the catalyst a gaseous product comprising the vicinal diketone, the step which consists of at periodic intervals of time while maintaining the conditions otherwise substantially unchanged, briefly discontinuing the flow of molecular oxygen to the catalyst and then restoring the flow of said gaseous mixture to the catalyst.

References Cited in the file of this patent

UNITED STATES PATENTS

| Number | Name | Date |
|---|---|---|
| 2,393,532 | Hearne et al. | Jan. 22, 1946 |
| 2,474,334 | Schmidl | June 28, 1949 |
| 2,608,585 | Detling et al. | Aug. 26, 1952 |
| 2,614,125 | Detling et al. | Oct. 14, 1952 |